Figure 1:
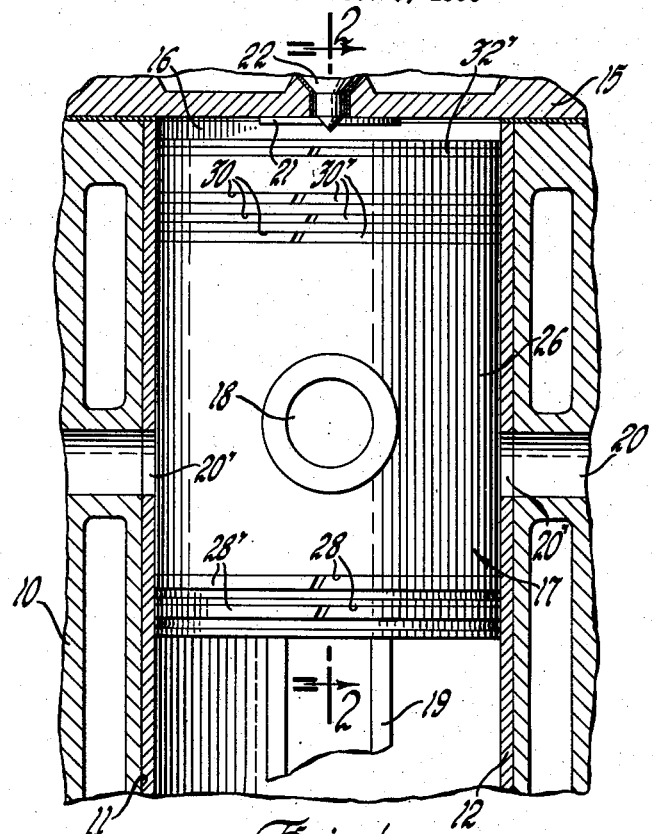

Oct. 20, 1959  J. DICKSON  2,909,160

PISTON

Filed Dec. 3, 1956

INVENTOR.
John Dickson
BY
ATTORNEY

United States Patent Office 2,909,160
Patented Oct. 20, 1959

2,909,160

PISTON

John Dickson, Bloomfield, Mich., assignor to General Motors Corporation, Detroit, Mich., a corporation of Delaware Application December 3, 1956, Serial No. 625,868

10 Claims. (Cl. 123—32)

This invention relates to an internal combustion engine of the reciprocating piston type and more particularly to a piston for such an engine.

In internal combustion engines of the aforementioned type, the extreme cyclic thermal conditions occuring within each expansible combustion chamber therein result in the cyclic expansion and contraction of the surfaces defining the combustion chamber and of the layers of metal immediately adjacent thereto, the remainder of the engine being subjected to substantially steady-state heat transfer conditions. As set forth in copending United States Patent No. 2,791,989 issued in the name of John Dickson and entitled "Internal Combustion Engine," such cyclic surface expansion and contraction have been found to be a primary cause of cracking failures of such combustion chamber surfaces.

As applied to the piston, this cyclic expansion and contraction of the combustion chamber surface of the piston head and of the adjacent layer of metal also results in the affected material progressively acquiring a permanent set slightly warping or deflecting the head upwardly and causing the rim of the piston to grow radially outwardly. To compensate for the tendency of the piston head and rim to warp and grow radially under engine operating conditions, the side walls of such pistons are generally tapered adjacent their head ends to provide a greater initial clearance between the combustion chamber rim of the piston and the side walls of the cylinder. However, this mushrooming distortion of the combustion chamber end surface and rim of a conventional piston generally prevents the satisfactory use of a first compression or "fire" control ring immediately adjacent such rim since distortion of the ring-mounting groove compressively clamps the ring thereby rendering the ring incapable of yieldably and sealingly engaging the bore of the associated cylinder. Such clamping of a piston ring results in scoring of the cylinder and ring, increasing the operating temperatures of the ring and cylinder wall due to exhaust blow-by and friction, and in certain cases with eventual seizure of the piston. In the absence of such a fire control ring, the tapered clearances required by conventional pistons reduces the effective compression, scavenging and timing control of the engine and thereby engine power and efficiency.

As the rim of such an engine piston is maintained at substantially lower temperatures than the remainder of the piston head surface by the adjacent, relatively cooler cylinder wall, the cyclic expansion and contraction of the combustion chamber surface material also places this relatively cooler outer rim in cyclic tension which eventually results in radial cracking of the piston rim. This tendency of the rim to crack radially would, of course, be increased in conventional pistons were the rim undercut to form a groove for mounting a "fire" ring.

This invention contemplates an improved piston having a shallow peripheral groove in the piston crown of a width and depth to accommodate and isolate the cyclic expansion and contraction of the combustion chamber surface and the immediately adjacent layer of the piston from the piston rim; such groove being substantially of the type shown and disclosed in the aforementioned copending application. It has been found that the use of such a groove substantially reduces both the radial growth of the piston rim and the permanent distortion imparted to the piston crown and combustion chamber surface under engine operating conditions. Thus the use of such a groove permits a substantial reduction in the necessary clearances required between the piston rim and the cylinder bore. The use of such a groove also permits the use of a compression ring immediately below the combustion chamber surface of the piston. The reduced clearances between the piston rim and the cylinder bore and the use of the high compression rim provide for greater engine efficiency due to closer design control of the effective compression ratio, of the exhaust gas scavenging, and of the opening and closing of intake and exhaust ports in loop and uniflow scavenged, two-cycle engines thereby reducing exhaust gas blow by into the air box. Due to the smaller clearances permitted between the rim and the cylinder bore when using such a groove, the rim is maintained in closer heat exchanging contact with the cylinder wall which, along with the substantial elimination of tensive stresses on this relatively cooler rim section, results in better rim life.

Figure 2:
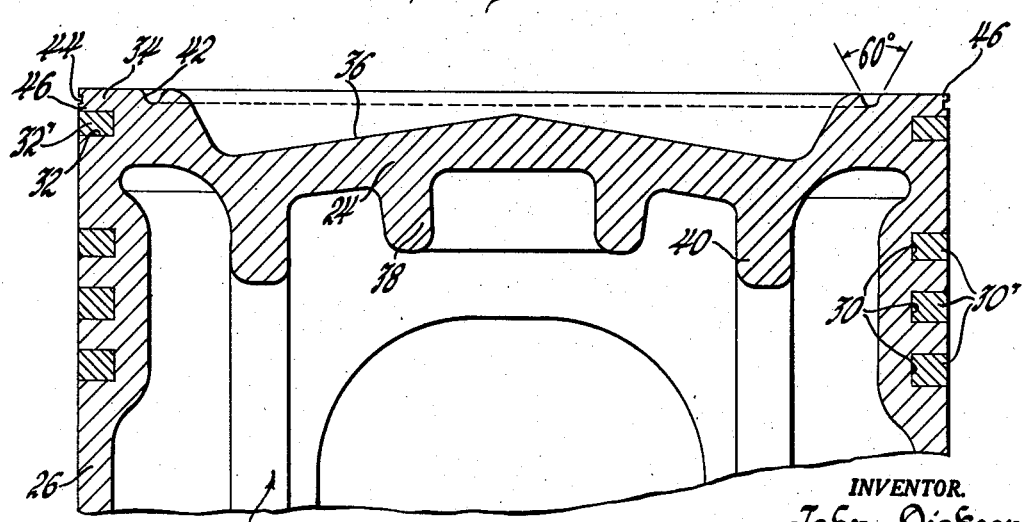

The foregoing and other objects, features and advantages of the invention will be more thoroughly understood from the following description of a preferred embodiment thereof having reference to the attached drawing, in which:

Figure 1 is a view showing a cylinder of an internal combustion engine in longitudinal section and showing a piston in elevation which is reciprocably mounted therein and constructed in accordance with the invention; and Figure 2 is an enlarged sectional view of the upper portion of the piston taken substantially on the plane represented by the line 2—2 in Figure 1.

Referring more particularly to the drawing, Figure 1 shows a cylinder block 10 of an internal combustion engine of a uniflow two-cycle fuel-injection compression-ignition type. A bore 11 extending through the block 10 mounts a cylinder liner 12, and a cylinder head 15 mounted on and sealed with respect to the cylinder block and liner forms an expansible combustion chamber 16 with a piston 17 reciprocably mounted in the cylinder liner. The piston is connected in a conventional manner by a wrist pin 18 and a connecting rod 19 to the engine crankshaft, not shown. The cylinder block 10 and the cylinder liner 12 have a plurality of radially aligned air intake ports 20 and 20', respectively, intermediate their ends. These ports are controllable by the reciprocation of the piston and preferably open tangentially onto the bore of the cylinder liner to impart a circular swirl to the scavenging and charging air as it enters the expansible chamber 16. The cylinder head is provided with suitable exhaust passages, not shown, which are controlled by one or more valves 21 operable by conventional actuating mechanisms, also not shown. The cylinder head also mounts an injector 22 which is adapted to inject oil or gaseous fuel into the combustion chamber as the piston 17 approaches the upper limit of its travel or top dead center.

As best shown by Figure 2, the piston 17 comprises a head or crown portion 24, the upper surface of which forms a moveable end wall for the expansible combustion chamber 16, and a skirt portion 26 extending longitudinally from the outer periphery of the crown portion 24. The crown and skirt portions of the piston may be formed separately, but in the embodiment shown are formed integrally of each other, the outer circumferential surfaces thereof being substantially co-extensive. The piston skirt has two outwardly facing circumferential grooves 28 adjacent its lower end and three similar grooves 30 adjacent its upper end which mount expansible oil and compression control rings 28' and 30', respectively, which slidingly and sealingly engage the bore of the cylinder liner 12. A similar groove 32 is also formed in the head portion of the piston and mounts a first compression or "fire" control ring 32'. The groove 32 is located immediately below the combustion chamber surface of the piston and defines a piston rim 34 of relatively narrow axial thickness. Inwardly of the rim 34, the piston head is provided with an upwardly facing central bowl 36, the underside of which is reinforced by a central annular boss or rib 38 and an outer longitudinally extending annular web 40.

An annular upwardly facing groove 42 is formed in the upper surface of the crown portion 24 intermediate the bowl 36 and the rim 34. The groove 42 is of a depth substantially equal to the thickness of the above-discussed layer of the crown portion immediately adjacent the combustion chamber surface thereof which is subjected to the cyclic expansive and contractive conditions induced by the exposure of the combustion chamber surface of the piston to the rapid and extreme cyclic thermal conditions occurring within the combustion chamber. The width of the groove 42 is sufficient to accommodate the radial expansion of the above-indicated combustion chamber exposed surface layer occurring radially inwardly of the groove thereby isolating such cyclic expansion and contraction from the rim 34. To prevent the accumulation of combustion products, i.e. carbon, in the groove 42, the side walls thereof are preferably inclined to each other at a suitable angle such as 60° and the corners thereof are preferably rounded, as shown in the illustrative embodiment.

By isolating the cyclic expansion and contraction of the combustion chamber surface or layer from the piston rim, the progressive distortion and radial growth of the rim are substantially reduced from that which would occur with pistons of conventional construction. In addition to permitting the use of the relatively high compression control ring 32', this reduced distortion and growth permits the piston head including the rim 34 to be formed on substantially the same diameter as the adjacent upper end of piston skirt 26 without the conventional tapered clearances normally required on such pistons. To accommodate any limited growth of the piston rim which should occur, the rim 34 is preferably provided with a very shallow circumferential groove 44 thereby forming two annular "scuff" or wear-accommodating bands 46 which permit the rim to establish or maintain working clearances with the cylinder liner.

From the foregoing, it will be apparent to those skilled in the art that the invention provides an improved piston construction eliminating excessive distortion and growth of the piston head and rim, permitting the use of a combustion control ring immediately adjacent the rim of the piston, providing better wear and combustion heat accommodating characteristics, and generally providing better design control over the engine operating cycle and characteristics and hence improved engine efficiency. While the foregoing description and drawing have been confined to one illustrative embodiment, it will be readily apparent that various modifications may be made therein without departing from the spirit and scope of the invention as defined in the following claims.

I claim:

1. A piston for an internal combustion engine comprising a head portion having a peripheral surface slidably engageable with the side walls of a cylinder and an end surface defining a movable end wall of an expansible combustion chamber, said head portion adjacent to and including said end wall surface being subjected to cyclic thermal conditions and the remainder of said head portion being subjected to substantially steady state thermal conditions, and a skirt portion having a circumferential surface co-extensive with the peripheral surface of said portion and slidably engageable with the side walls of said cylinder, said piston head portion having an annular groove formed therein adjacent its outer periphery and opening on said end wall surface, said groove being limited substantially to the depth of said head portion subjected to cyclic thermal conditions and to a width to permit the relative unrestricted cyclic expansion and contraction of the end wall surface of said head portion radially inwardly of said groove thereby isolating tensive stresses due to such expansion of said end wall surface from said peripheral surface.

2. A piston for an internal combustion engine including a head slidable in bearing relation with the side walls of a cylinder and having an end surface forming a movable end wall of an expansible combustion chamber, the combustion-chamber-facing surface layer of said head being subjected to cyclic thermal conditions and the remainder of said piston being subjected to substantially steady state thermal conditions, and said piston head having an annular groove therein adjacent its outer periphery and opening on said combustion chamber, said groove being limited to a depth substantially equal to the depth of said surface layer and to a width permitting relatively unrestricted plastic expansion and contraction of the surface layer of said piston head radially inwardly of said groove.

3. A piston for an internal combustion engine, said piston having a circumferential surface slidable in bearing relation with the side walls of a cylinder and having an end portion defining an end wall of an expansible combustion chamber, the surface and adjacent layer of said end portion being subjected to the cyclic thermal conditions occurring within said combustion chamber due to the normal engine operating cycle and the remainder of said piston being subjected to substantially steady state thermal conditions, and said piston having an annular groove therein immediately adjacent the outer periphery of said end surface and facing said combustion chamber, said groove defining a peripheral rim and being of a depth substantially equal to the layer of said piston adjacent said end surface subjected to said cyclic thermal conditions and of a width to permit relatively unrestricted plastic expansion and contraction of this surface layer radially inwardly of said groove thereby preventing cyclic tensive stresses from being imposed on said peripheral rim by the expansion of said surface layer.

4. A piston for an internal combustion engine including a head portion having an end surface defining an end wall of an expansible combustion chamber and a skirt portion slidably engageable with the side walls of a cylinder, said skirt portion having a plurality of longitudinally spaced circumferential grooves formed therein normal to the axis of said piston and adapted to mount piston rings slidably and sealingly engageable with the side walls of the cylinder, one of said grooves being formed in a plane intersecting said head portion, and said head portion having an annular groove therein immediately adjacent its outer periphery and opening toward said combustion chamber, said last-mentioned groove being of a depth corresponding to that portion of the piston crown subjected to cyclic expansion and contraction due to the cyclic thermal operating condition within said combustion chamber and of a width to permit relatively unrestricted expansion and contraction of that portion radially inwardly of said groove.

5. In an internal combustion engine including a cylinder closed at one end and having a plurality of ports intermediate its ends, a piston reciprocably mounted in said cylinder and operable to control said ports, said piston comprising a head portion facing said closed cylinder end and forming an expansible combustion chamber therewith and a circumferential skirt portion extending longitudinally from the periphery of said head portion, said skirt portion having a plurality of longitudinally spaced circumferential grooves mounting oil and compression sealing rings slidably and sealingly engaging the side walls of said cylinder, and said head portion having a circumferential groove therein adapted to mount a combustion fire ring slidably and sealably engageable with the side walls of the cylinder, and said head portions having an annular groove therein facing said closed end of said cylinder, said grooves in said head portion defining a peripheral rim and said last-mentioned annular groove being of a depth corresponding to that layer of the head portion subjected to cyclic expansion and contraction due to the cyclic thermal operating condition within said combustion chamber and of a width to permit relatively unrestricted expansion and contraction of that layer radially inwardly of said groove thereby isolating said cyclic expansion and contraction from said rim.

6. A piston for an internal combustion engine including a head portion slidably engageable with a cylinder and having an end surface defining an end wall of an expansible combustion chamber, said head portion having a circumferential groove adjacent said combustion chamber mounting a compression ring slidably and engageable with the side walls of the cylinder, and said head portion having an annular groove therein adjacent the periphery thereof and facing said combustion chamber, said grooves in said head portion defining a peripheral rim, and said last-mentioned annular groove being of a depth corresponding to the end layer of said piston head portion subjected to cyclic expansion and contraction due to the cyclic thermal operating condition within said combustion chamber and of a width to permit relatively unrestricted expansion and contraction of that portion radially inwardly of said groove thereby isolating said cyclic expansion and contraction from said rim.

7. A piston reciprocably mountable within an engine cylinder, said piston having a head portion defining an end wall of an expansible combustion chamber, said head portion having a circumferential groove adjacent said combustion chamber mounting a compression ring slidably and sealably engageable with the side walls of the cylinder, said circumferential groove defining a peripheral rim on said head portion slidably engageable with the cylinder, said rim being circumferentially undercut to reduce the heat conducting and wearable surface thereof engageable with the cylinder, and said head portion having an annular groove therein adjacent said peripheral rim and facing said closed end of said cylinder, said last-mentioned annular groove being of a depth corresponding to the end layer of said piston head portion subjected to cyclic expansion and contraction due to the cyclic thermal operating condition occurring within said combustion chamber and of a width to permit relatively unrestricted expansion and contraction of that portion radially inwardly of said groove thereby isolating said cyclic expansion and contraction from said rim.

8. A piston for an internal combustion engine having a head portion defining an end wall of an expansible combustion chamber, said head portion having a peripheral rim slidably and sealably engageable with the side walls of a cylinder and an annular groove therein adjacent said peripheral rim and facing said combustion chamber, said annular groove being of a depth corresponding to the end layer of said piston head portion normally subjected to cyclic expansion and contraction due to cyclic thermal operating conditions within the combustion chamber and of a width to permit relatively unrestricted expansion and contraction of that portion radially inwardly of said groove thereby isolating such cyclic expansion and contraction from said rim.

9. A piston as set forth in claim 8 in which said rim is circumferentially grooved to reduce the wearable and heat conducting surface engageable with the cylinder.

10. In a two cycle internal combustion engine of the compression ignition type, a cylinder closed at one end and having a plurality of intake ports intermediate the ends thereof, a piston reciprocably mounted in said cylinder and controlling said ports, said piston having a head portion with a crown surface thereon facing said closed cylinder end and forming an expansible combustion chamber therewith and a circumferential skirt portion extending longitudinally from said head portion, said head portion and said skirt portion having co-extensive outer cylindrical surfaces, said skirt portion having plurality of longitudinally spaced circumferential grooves mounting oil and compression sealing rings slidably and sealingly engaging the side walls of said cylinder, and said head portion having a circumferential groove therein immediately adjacent its crown surface and mounting a fire control compression ring slidably and sealingly engaging the side walls of said cylinder, and said head portion having an annular groove therein facing said closed cylinder end and adjacent the periphery of said crown surface, said last-mentioned groove being of the depth of said crown surface subjected to cyclic expansion and contraction due to the cyclic thermal operating conditions within the combustion chamber and of a with to accommodate and isolate cyclic expansion and contraction of said crown surface thereby preventing distortion of the ring-mounting circumferential groove in said head portion and reducing radial growth of said crown surface under engine operating conditions.

References Cited in the file of this patent

UNITED STATES PATENTS

| | | |
|---|---|---|
| 788,057 | Morrison | Apr. 25, 1905 |
| 1,320,064 | Junkers | Oct. 28, 1919 |
| 2,221,535 | Berry | Nov. 12, 1940 |
| 2,511,992 | Quick | June 20, 1950 |

UNITED STATES PATENT OFFICE
CERTIFICATE OF CORRECTION

Patent No. 2,909,160                      October 20, 1959

John Dickson

It is hereby certified that error appears in the printed specification of the above numbered patent requiring correction and that the said Letters Patent should read as corrected below.

Column 3, line 4, for "picton" read -- piston --; line 74, before "portion" insert -- head --; column 5, line 3, for "portions" read -- portion --; line 19, before "engageable" insert -- sealably --; column 6, line 27, after "having" insert -- a --; line 40, for "with" read -- width --.

Signed and sealed this 12th day of April 1960.

(SEAL)
Attest:

KARL H. AXLINE                     ROBERT C. WATSON

Attesting Officer                Commissioner of Patents